UNITED STATES PATENT OFFICE.

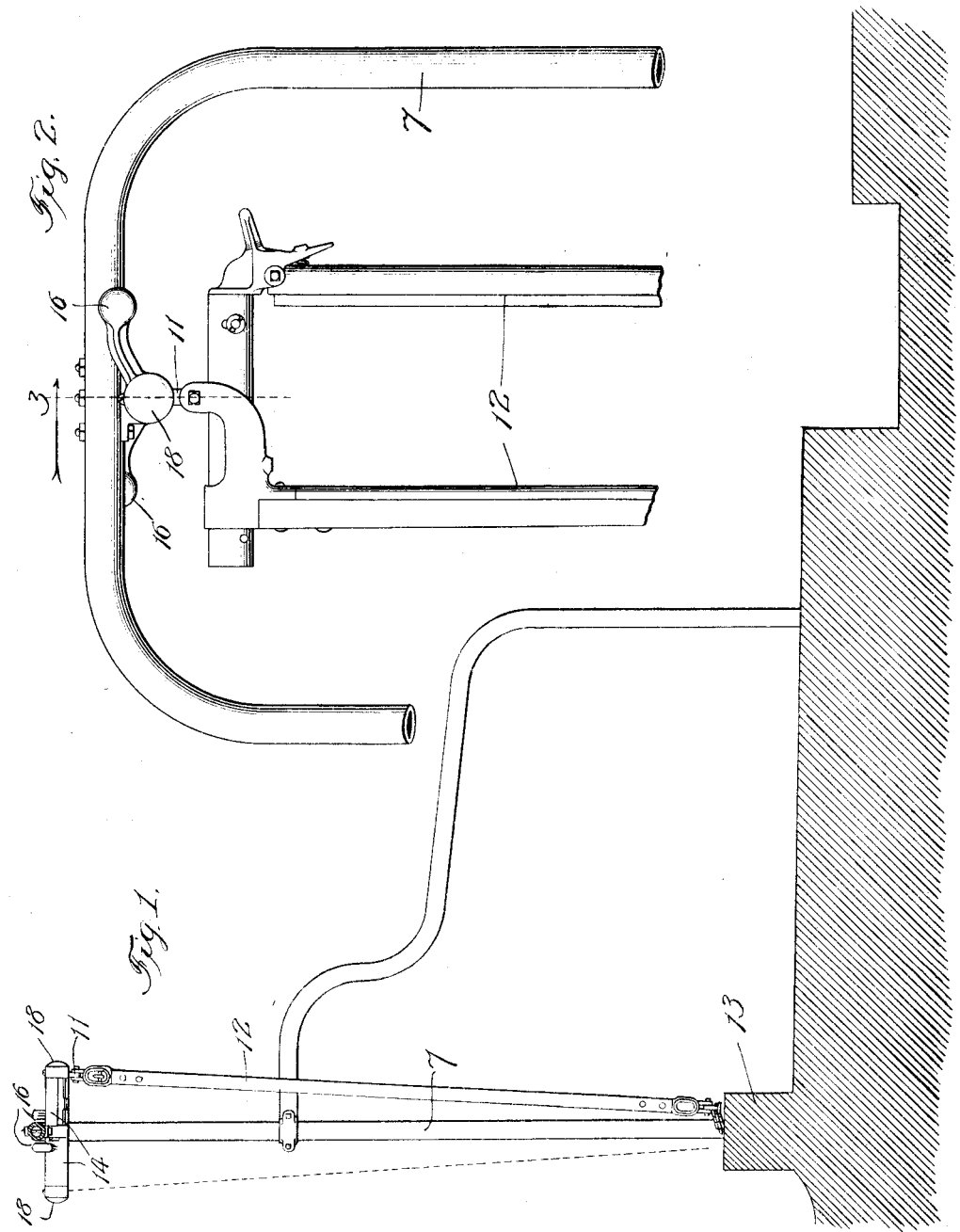

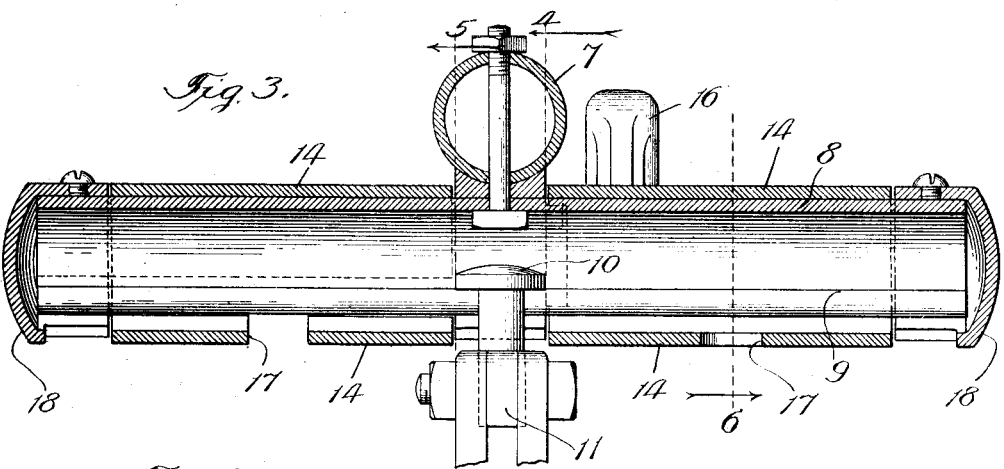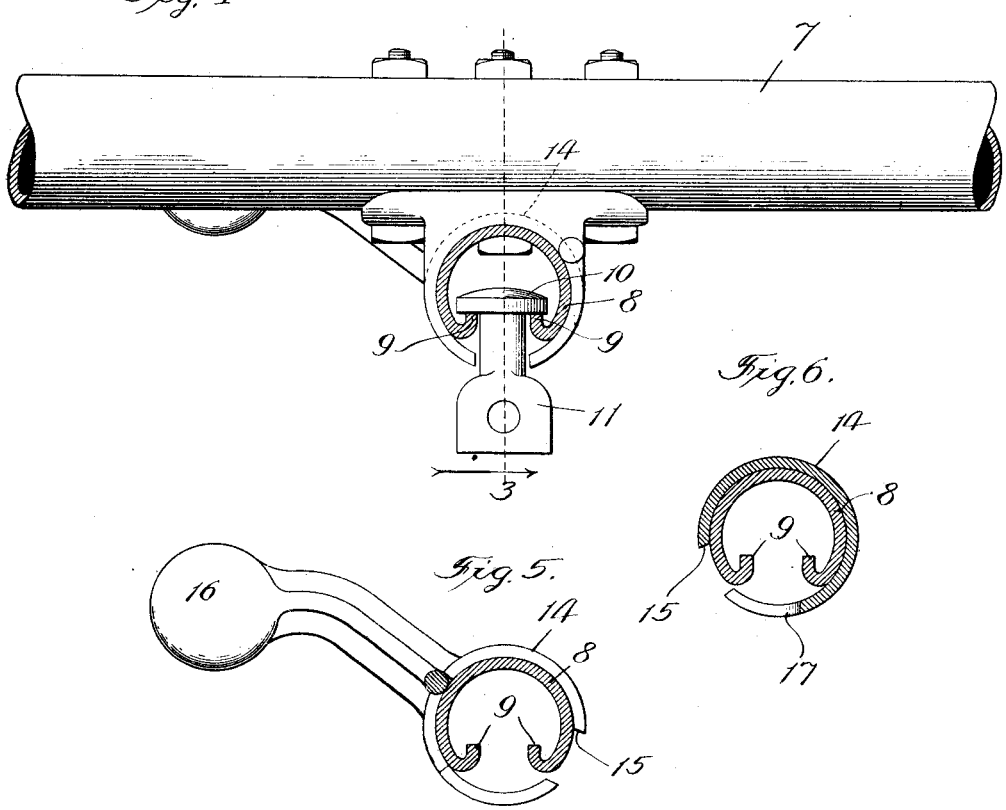

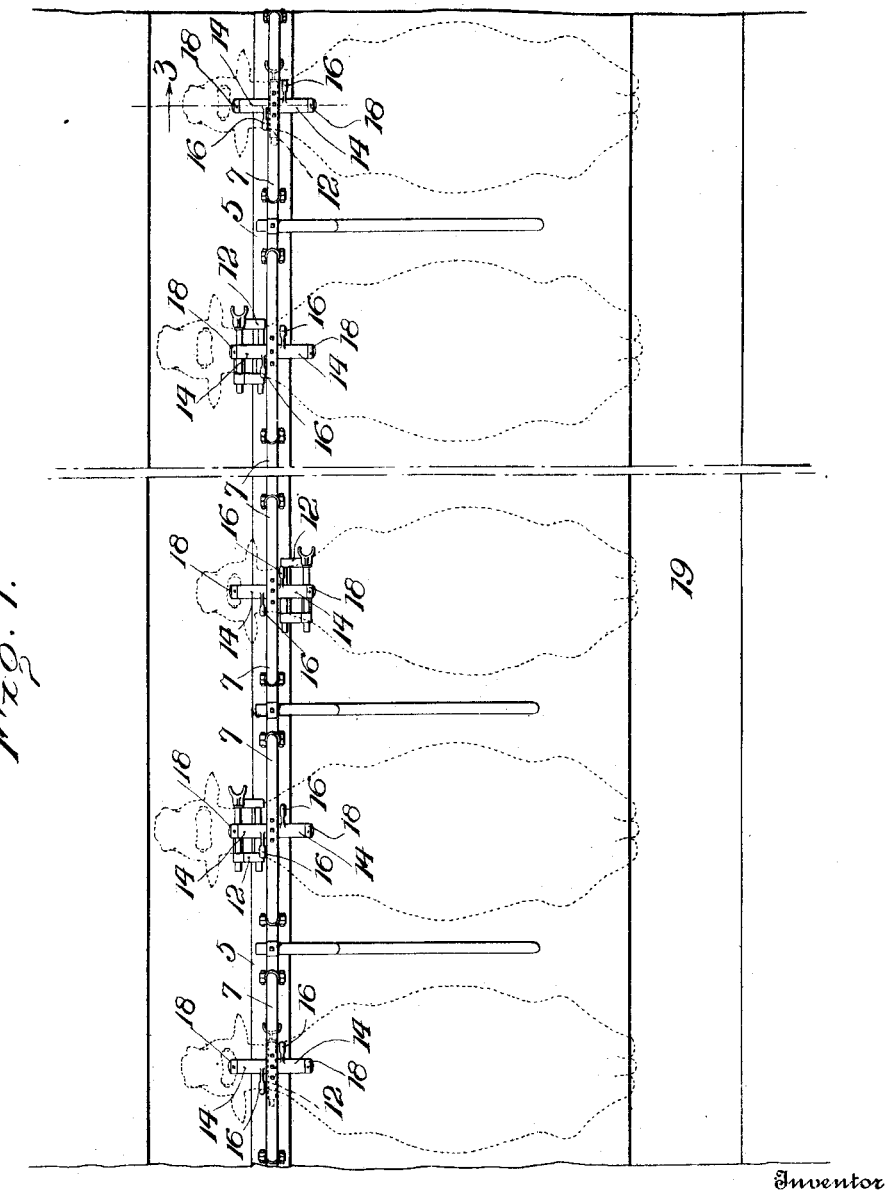

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

ANIMAL-STALL.

1,172,226.

Specification of Letters Patent.

Patented Feb. 15, 1916.

Application filed October 22, 1915. Serial No. 57,297.

*To all whom it may concern:*

Be it known that I, HENRY L. FERRIS, a citizen of the United States, residing at Harvard, in the county of McHenry and State of Illinois, have invented a new and useful Improvement in Animal-Stalls, of which the following is a specification.

My invention relates to certain new and useful improvements in animal stalls and is fully described and explained in the specification and shown in the accompanying drawings, in which:—

Figure 1 is a longitudinal section through a stall embodying my improved construction; Fig. 2 is an elevation of a part of the end-frame and stanchion; Fig. 3 is a section on the line 3 of Fig. 2; Fig. 4 is a section on the line 4 of Fig. 3; Fig. 5 is a section on the line 5 of Fig. 3; Fig. 6 is a section on the line 6 of Fig. 3, and Fig. 7 is a plan view of a series of stalls containing my invention.

Referring to the drawings, 7 is the frame which sets transversely of each of the series of stalls and forms the front end thereof. Transverse to this frame and therefore longitudinally of the stall is a tube 8 beneath the frame and extending both in front of and behind the same. This tube is slotted on its lower face and its edges adjacent the slot are turned up at 9 to form tracks upon which runs the head 10 of a slidable stanchion support 11.

12 is the stanchion or other animal-fastening means, the lower end of which is attached to the curb 13 of the stall in any suitable manner. The upper end of the stanchion can, by this mechanism, be set at different positions along the tube 8.

For the purpose of locking the stanchion in the desired positions, locking sleeves 14 surround the tube 8, these sleeves being slotted at 15 and each locking sleeve being provided with a handle 16 by which it may be rocked. When the sleeves are in the position shown in Fig. 6, the stanchion is locked centrally of the tube 8. If it is desired to move the upper end of the stanchion either forward or back, the corresponding sleeve is rocked to bring its slot into registration with the slot of the tube 8 and the stanchion is then moved in the desired direction. It can be locked midway of the length of the sleeve by engaging with a notch 17 thereof, or it can be locked at the extreme end of the tube by being moved past the sleeve when it will abut with a cap 18 which closes the end of the tube. There are thus provided five positions in which the stanchion can be set and locked.

My present structure is desirable in that it provides an adjusting means which can be operated with the animal in place. It has heretofore been the practice for many years to adjust the effective length of stalls so as to aline the cattle with the gutters at the rear of the stalls, such a gutter being shown at 19. In the use of relatively small herds, such as were common up to a few years ago, each animal in a herd was assigned to a given stall and trained to enter that stall. The stall being adjusted to accommodate the particular length of the animal assigned thereto, there was no difficulty in keeping the animal in a sanitary condition. With the development of large herds made possible by the wide-spread use of the milking machine, it has been found absolutely impossible to train the cattle to enter their respective stalls. As a result the adjustable devices heretofore provided have become entirely useless in the case of large herds and if installed are left idle, no effort being made to train the cattle to enter individual stalls. In order to remedy this difficulty, I have found it necessary to provide some mechanisms which can be manually and quickly adjusted while the animal is in place, as distinguished from prior devices which have to be adjusted with special tools, such as wrenches, screw-drivers, and the like. In them the adjustment has been a matter involving quite a little time, so much time that the adjustment with the animal in place was absolutely impossible. With my improved device, where the adjustment is instantaneous, the animals enter the stalls indiscriminately and in practice it is found that only a relatively small percentage of a given herd requires adjustment. These can be lined up very quickly at the time when the stanchions are being closed on the animals' necks.

I realize that considerable variation is possible in the details of this construction without departing from the spirit of my invention; therefore I do not intend to limit myself to the specific form herein shown and described except as pointed out in the following claims, in which it is my intention to claim all the novelty inherent in the construction as broadly as is permitted by the state of the art.

What I claim as new and desire to secure by Letters Patent is:—

1. In combination, a series of stalls each one of which is adapted to receive any one of the units of a herd indiscriminately, animal-holding devices for the several stalls, a gutter at the rear of the series, manually operated means for quickly adjusting the animal-holding devices longitudinally of the stalls after the animal is in place therein and for securing said animal-holding devices in adjusted position, whereby each of the units of the herd is alined with the said gutter irrespective of the length of said units.

2. In combination, a stall provided with a gutter, longitudinal guiding means centrally located in the front of the stall and bearing a fixed relation to the gutter, a stanchion carried by the guiding means and movable along the same, and stanchion securing mechanism for securing the stanchion in fixed positions on the guiding means and manually and quickly releasable to permit the adjustment of the stanchion while an animal is held thereby.

3. In combination, a stall provided with a gutter, a tubular guide, a stanchion, a stanchion-carrying member running in a slot in the guide, and means for locking the stanchion-carrying member in a variety of positions in the guide, and adapted to release and lock the same quickly to permit its adjustment while an animal is held thereby.

4. In combination, a stall provided with a gutter at its rear, a longitudinal tubular guide at its front, a stanchion, a stanchion-carrying member running in a slot in the guide, and a slotted sleeve embracing the tubular guide and adapted by rotation to lock the stanchion-supporting member in a variety of positions.

In testimony whereof I have hereunto set my hand this 29th day of Sept., 1915.

HENRY L. FERRIS.

In presence of two subscribing witnesses:
LEO L. HAMILTON,
G. A. BURNEY.